US010407055B2

(12) United States Patent
Kim

(10) Patent No.: US 10,407,055 B2
(45) Date of Patent: Sep. 10, 2019

(54) METHOD AND DEVICE FOR LEARNING ENGINE CLUTCH KISS POINT OF HYBRID VEHICLE

(71) Applicants: Hyundai Motor Company, Seoul (KR); Kia Motors Corporation, Seoul (KR)

(72) Inventor: Do Hee Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 86 days.

(21) Appl. No.: 15/603,216

(22) Filed: May 23, 2017

(65) Prior Publication Data

US 2018/0170359 A1  Jun. 21, 2018

(30) Foreign Application Priority Data

Dec. 15, 2016 (KR) ........................ 10-2016-0171943

(51) Int. Cl.
*B60W 20/40* (2016.01)
*F16D 48/06* (2006.01)
(Continued)

(52) U.S. Cl.
CPC ............. *B60W 20/40* (2013.01); *B60K 6/387* (2013.01); *B60W 10/02* (2013.01); *B60W 10/06* (2013.01);
(Continued)

(58) Field of Classification Search
CPC .. B60W 20/40; B60W 2540/12; B60W 10/02; B60W 10/08; B60W 10/06; B60W 2540/10; B60W 2510/0638; B60W 2510/0275; B60W 2510/0241; B60W 2710/081; B60W 2710/0644; B60W 2710/025; B60K 6/387; F16D 48/06; F16D 2500/30406; F16D 2500/31426; F16D 2500/3144; F16D 2500/3067; F16D 2500/50245; F16D 2500/1064; F16D 2500/106; F16D 2500/10412; B60Y 2300/60; B60Y 2300/43; B60Y 2300/42; B60Y 2200/92; Y10S 903/93; Y10S 903/914

See application file for complete search history.

(56) References Cited

U.S. PATENT DOCUMENTS

2013/0291830 A1* 11/2013 Doering ................ F02D 41/023
 123/350
2017/0120897 A1* 5/2017 Park, II ........... B60W 30/18072

FOREIGN PATENT DOCUMENTS

KR  10-1684525 B1  12/2016
KR  10-1724472 B1  4/2017

* cited by examiner

Primary Examiner — Yuen Wong
(74) Attorney, Agent, or Firm — Mintz Levin Cohn Ferris Glovsky and Popeo, P.C.; Peter F. Corless

(57) ABSTRACT

A method for learning engine clutch kiss point of a hybrid vehicle is provided. The method includes adjusting a speed of a driving motor to be reduced when a deceleration event is generated in front of the hybrid vehicle and adjusting a speed of an engine to be synchronized with the speed of the driving motor. An engine clutch that connects the engine with the driving motor or disconnects the engine from the driving motor is engaged to start and then a kiss point of the engine clutch is learned by detecting the kiss point that is generated when the engine clutch is in a slip state.

11 Claims, 6 Drawing Sheets

(51) Int. Cl.
  *B60W 10/06* (2006.01)
  *B60W 10/08* (2006.01)
  *B60W 10/02* (2006.01)
  *B60K 6/387* (2007.10)
  *B60W 50/00* (2006.01)
  *B60W 20/00* (2016.01)

(52) U.S. Cl.
  CPC ............ *B60W 10/08* (2013.01); *B60W 20/00* (2013.01); *B60W 50/0098* (2013.01); *F16D 48/06* (2013.01); *B60W 2050/0088* (2013.01); *B60W 2510/0241* (2013.01); *B60W 2510/0275* (2013.01); *B60W 2510/0638* (2013.01); *B60W 2510/0657* (2013.01); *B60W 2510/081* (2013.01); *B60W 2540/10* (2013.01); *B60W 2540/12* (2013.01); *B60W 2710/025* (2013.01); *B60W 2710/0644* (2013.01); *B60W 2710/081* (2013.01); *B60Y 2200/92* (2013.01); *B60Y 2300/42* (2013.01); *B60Y 2300/43* (2013.01); *B60Y 2300/60* (2013.01); *F16D 2500/106* (2013.01); *F16D 2500/1064* (2013.01); *F16D 2500/10412* (2013.01); *F16D 2500/3067* (2013.01); *F16D 2500/30406* (2013.01); *F16D 2500/3144* (2013.01); *F16D 2500/31426* (2013.01); *F16D 2500/50245* (2013.01); *Y02T 10/6286* (2013.01); *Y10S 903/914* (2013.01); *Y10S 903/93* (2013.01)

METHOD AND DEVICE FOR LEARNING ENGINE CLUTCH KISS POINT OF HYBRID VEHICLE

CROSS-REFERENCE TO RELATED APPLICATION

This application claims priority to and the benefit of Korean Patent Application No. 10-2016-0171943 filed in the Korean Intellectual Property Office on Dec. 15, 2016, the entire contents of which are incorporated herein by reference.

BACKGROUND

(a) Field of the Invention

The present invention relates to a hybrid vehicle, and more particularly, to a method and a device for learning engine clutch kiss point of a hybrid vehicle.

(b) Description of the Related Art

An environmentally-friendly vehicle includes a fuel cell vehicle, an electric vehicle, a plug-in electric vehicle, and a hybrid vehicle, and typically includes a motor configured to generate driving force. A hybrid vehicle uses an internal combustion engine and power of a battery together. In other words, the hybrid vehicle efficiently combines and uses power of the internal combustion engine and power of a motor.

The hybrid vehicle includes an engine, a motor, an engine clutch to adjust power between the engine and the motor, a transmission, a differential gear apparatus, a battery, a starter-generator configured to start the engine or generate electricity by output of the engine, and wheels. Further, the hybrid vehicle includes a hybrid control unit (HCU) configured to operate the hybrid vehicle, an engine control unit (ECU) configured to operate the engine, a motor control unit (MCU) configured to operate the motor, a transmission control unit (TCU) configured to operate the transmission, and a battery control unit (BCU) configured to operate and manage the battery.

The battery control unit may be referred to as a battery management system (BMS). The starter-generator may be referred to as an integrated starter and generator (ISG) or a hybrid starter and generator (HSG). The hybrid vehicle may be driven in a driving mode, such as an electric vehicle (EV) mode, which is an electric vehicle mode using power of the motor, a hybrid electric vehicle (HEV) mode, which uses rotational force of the engine as main power and uses rotational force of the motor as auxiliary power, and a regenerative braking (RB) mode in which braking and inertial energy is collected during driving by braking or inertia of the vehicle through electricity generation of the motor to charge the battery.

The hybrid vehicle operates the engine clutch to transmit power or separate power between the motor and the engine for switching the mode. Operation hydraulic pressure of the engine clutch determining an operation of the engine clutch considerably influences drivability, power performance, and fuel efficiency of the hybrid vehicle, and thus, the operation hydraulic pressure of the engine clutch should be accurately adjusted.

The operation hydraulic pressure of the engine clutch may be determined by initial hydraulic pressure by which torque is started to be transmitted as both ends of the friction material of the engine clutch are in contact with each other, and feedback hydraulic pressure for adjusting the hydraulic pressure of the engine clutch by receiving feedback of speeds of the engine and the motor. The initial hydraulic pressure point may be referred to a kiss point. The kiss point may be changed during the use of the engine clutch. Accordingly, hydraulic pressure of the engine clutch is adjusted to allow the engine clutch to transmit the torque at an appropriate point by learning the kiss point.

The above information disclosed in this section is merely for enhancement of understanding of the background of the invention and therefore it may contain information that does not form the prior art that is already known in this country to a person of ordinary skill in the art.

SUMMARY

The present invention provides a method and a device for learning engine clutch kiss point of a hybrid vehicle which are capable of learning a kiss point of an engine clutch while the vehicle is being driven.

An exemplary embodiment of the present invention provides the method for learning engine clutch kiss point of the hybrid vehicle that may include: adjusting, by a controller, a speed of a driving motor to be reduced when a deceleration event is generated in front of the hybrid vehicle; adjusting, by the controller, a speed of an engine to be synchronized with the speed of the driving motor; engaging, by the controller, an engine clutch that connects the engine with the driving motor or disconnects the engine from the driving motor to start; and learning, by the controller, a kiss point of the engine clutch by detecting the kiss point generated when the engine clutch is in a slip state.

The method for learning engine clutch kiss point of the hybrid vehicle may further include: determining, by the controller, whether a torque of the engine slip-engaged to the engine clutch is equal to or greater than a threshold value. The controller may be configured to terminate the kiss point learning of the engine clutch when the torque of the engine is less than the threshold value. The method for learning engine clutch kiss point may further include: determining, by the controller, whether the speed of the engine is maintained at a speed synchronized with the speed of the driving motor. The controller may be configured to engage the engine clutch to start when the speed of the engine is maintained at the speed synchronized with the speed of the driving motor.

The method for learning engine clutch kiss point of the hybrid vehicle may further include: detecting, by the controller, whether an accelerator pedal mounted within the hybrid vehicle is in an off-state; and detecting, by the controller, whether a brake pedal mounted within the hybrid vehicle is in an off-state. The controller may be configured to adjust a speed of the engine to increase to a speed synchronized with the speed of the driving motor when the accelerator pedal is in the off-state (e.g., disengaged) and the brake pedal is in the off-state (e.g., disengaged). The method for learning engine clutch kiss point of the hybrid vehicle may further include: detecting, by the controller, whether information regarding the deceleration event is generated. A navigation device of the hybrid vehicle may be configured to predict the deceleration event information and may provide the predicted deceleration event information to the controller.

An exemplary embodiment of the present invention provides the device for learning engine clutch kiss point of the hybrid vehicle that may include: an engine clutch configured to connect an engine with a driving motor or disconnect the engine from the driving motor; and a controller configured to adjust a speed of the driving motor to be reduced when a deceleration event is generated in front of the hybrid vehicle. The controller may be configured to adjust a speed of an engine to be synchronized with the speed of the driving motor, execute engagement of the engine clutch to start, and learn a kiss point of the engine clutch by detecting the kiss point generated when the engine clutch is in a slip state.

The method and the device for learning engine clutch kiss point of the hybrid vehicle according to the exemplary embodiment of the present invention may robustly perform kiss point learning of the engine clutch in a situation where deceleration of the vehicle is expected. The exemplary embodiment of the present invention may also learn the kiss point at various speeds of the engine or the driving motor by learning the kiss point while the vehicle is being driven using forward driving information of the vehicle, and thus may improve robustness of the engine clutch kiss point learning.

Further, since the exemplary embodiment of the present invention uses the forward driving information, it may expand a range of entering the kiss point during driving of the vehicle. In other words, to learn the kiss point, the exemplary embodiment of the present invention does not need to stop the engine and it may not be necessary for the exemplary embodiment to detect a state of a clutch of a transmission of the vehicle.

BRIEF DESCRIPTION OF THE DRAWINGS

A brief description of the drawings will be provided to more sufficiently understand the drawings which are used in the detailed description of the present invention.

DETAILED DESCRIPTION

Figure 1:
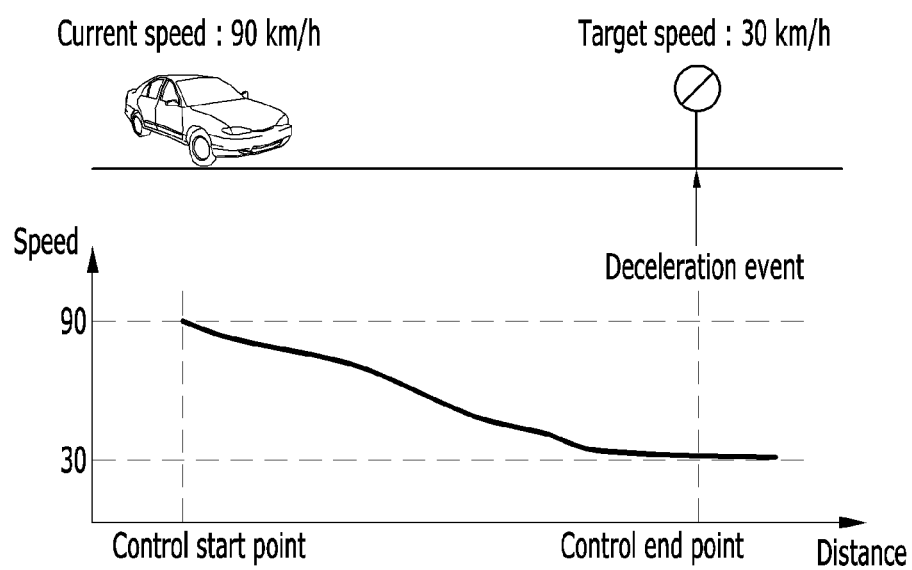
FIG. 1 is a view illustrating a situation in which deceleration control of a vehicle is performed according to deceleration event occurrence information according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In order to sufficiently understand the present invention and the object achieved by embodying the present invention, the accompanying drawings illustrating exemplary embodiments of the present invention and contents described in the accompanying drawings are to be referenced.

Hereinafter, the present invention will be described in detail by describing exemplary embodiments of the present invention with reference to the accompanying drawings. In describing the present invention, well-known configurations or functions will not be described in detail since they may unnecessarily obscure the gist of the present invention. Throughout the accompanying drawings, the same reference numerals will be used to denote the same components.

Throughout this specification and the claims that follow, when it is described that an element is "coupled" to another element, the element may be "directly coupled" to the other element or "electrically or mechanically coupled" to the other element through a third element. Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

In order to effectively transmit power of a hybrid vehicle, it is necessary to improve accuracy of an engine clutch engagement control. Since an engagement of the engine clutch is dependent on a physical state (e.g., a speed, an acceleration, or a frictional force) and an environmental factor (e.g., a temperature) of the engine clutch, accurate engagement control by a single fixed map table may be challenging. Therefore, it is essential to continuously learn a kiss point of the engine clutch for stable engagement of the engine clutch. Kiss point learning of the engine clutch performed at a parking (P) stage or a neural (N) stage according to a related art has a limited learning condition and cannot learn the kiss point when a transmission of a vehicle is in a drive (D) stage.

Kiss point learning of the engine clutch performed at the drive (D) stage according to a related art is performed during a shifting time that appears before a driving mode of a hybrid vehicle is switched from a hybrid electric vehicle (HEV) mode to an electric vehicle (EV) mode and during a coasting drive of the vehicle performed before the vehicle stops, and thus, the related art cannot avoid limitation of a learning condition of the engine clutch. In particular, the related art performs the kiss point learning by adjusting a speed of an engine or a motor which is a power source disposed at both ends of the engine clutch when the transmission of a vehicle is in the parking (P) stage or the neural (N) stage and the vehicle stops, but a learning condition of the related art is limited. Recently, it has been possible to effectively predict a forward driving situation by increasing accuracy of information regarding a driving situation in front of a vehicle that may be used in the vehicle.

FIG. 1 is a view illustrating a situation in which deceleration control of a vehicle is performed according to deceleration event occurrence information. Referring to FIG. 1, a vehicle traveling at about 90 km/h may decelerate by predicting forward driving information, which indicates a deceleration event with a target speed of about 30 km/h.

Figure 2:
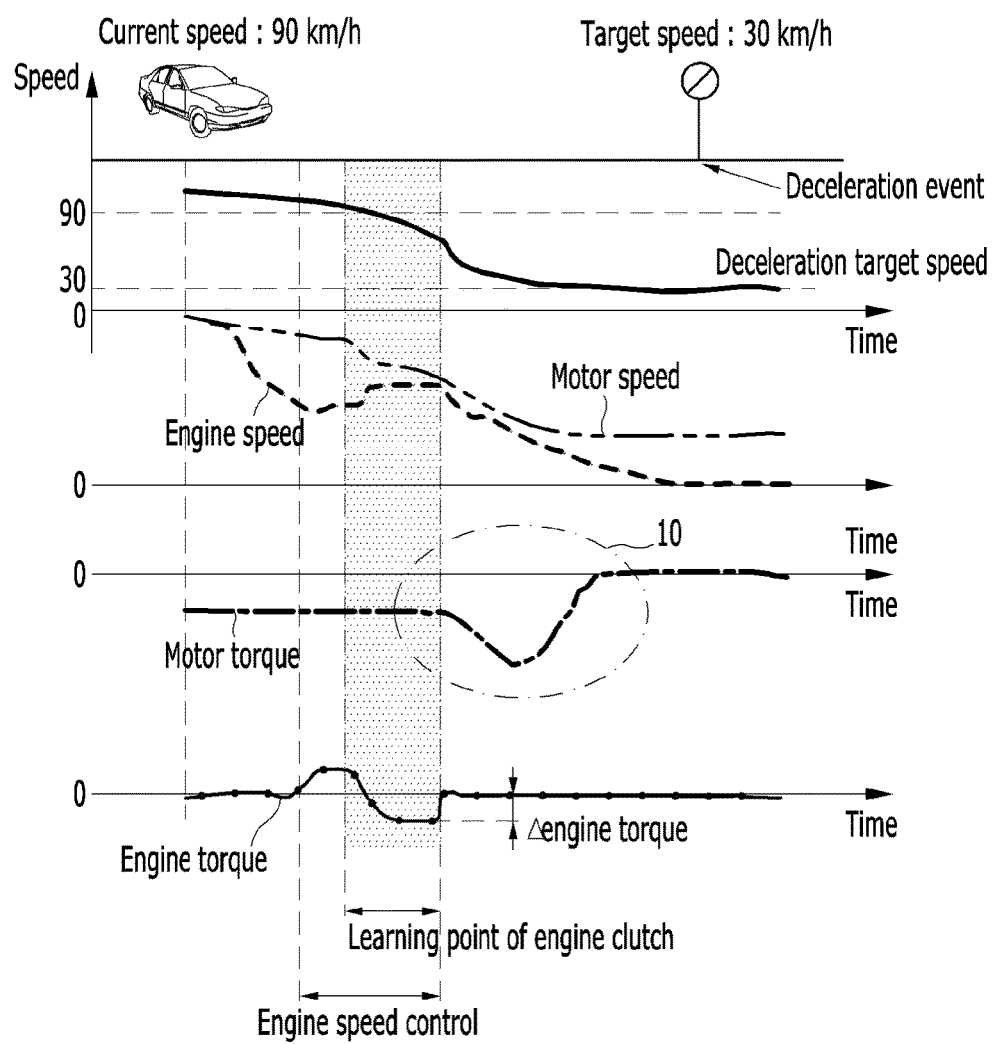
FIG. 2 is a view illustrating a method for learning engine clutch kiss point of a hybrid vehicle according to an exemplary embodiment of the present invention.
Figure 3:
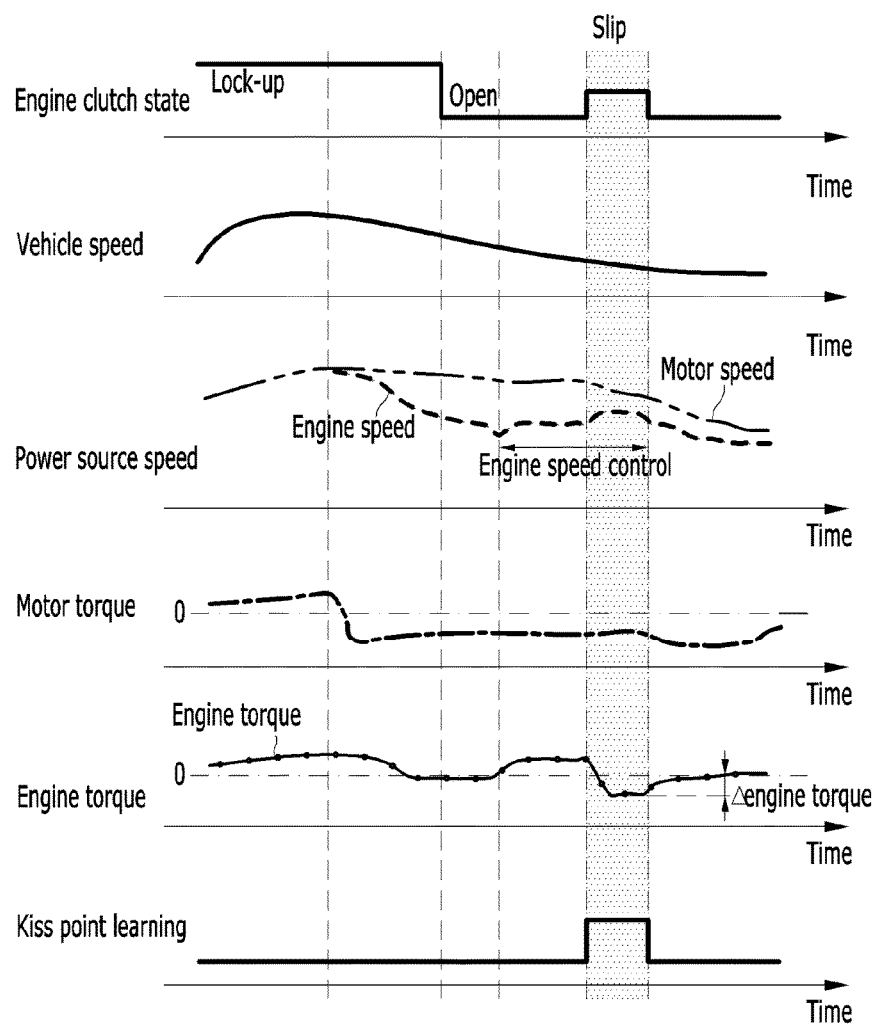
FIG. 3 is a view illustrating a state of an engine clutch which connects an engine of FIG. 2 with a driving motor of FIG. 2 or disconnects the engine from the driving motor according to an exemplary embodiment of the present invention.
Figure 4A:
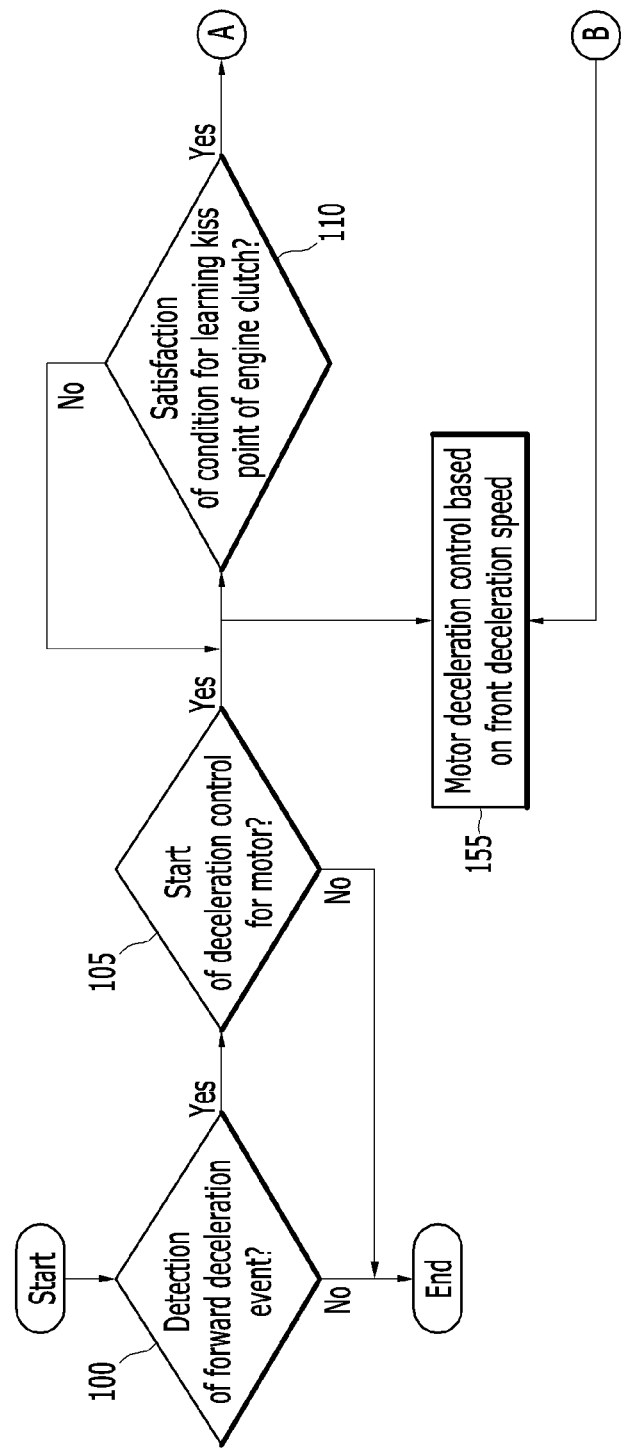
FIGS. 4A and 4B are a flowchart illustrating the method for learning engine clutch kiss point of the hybrid vehicle according to an exemplary embodiment of the present invention.
Figure 4B:
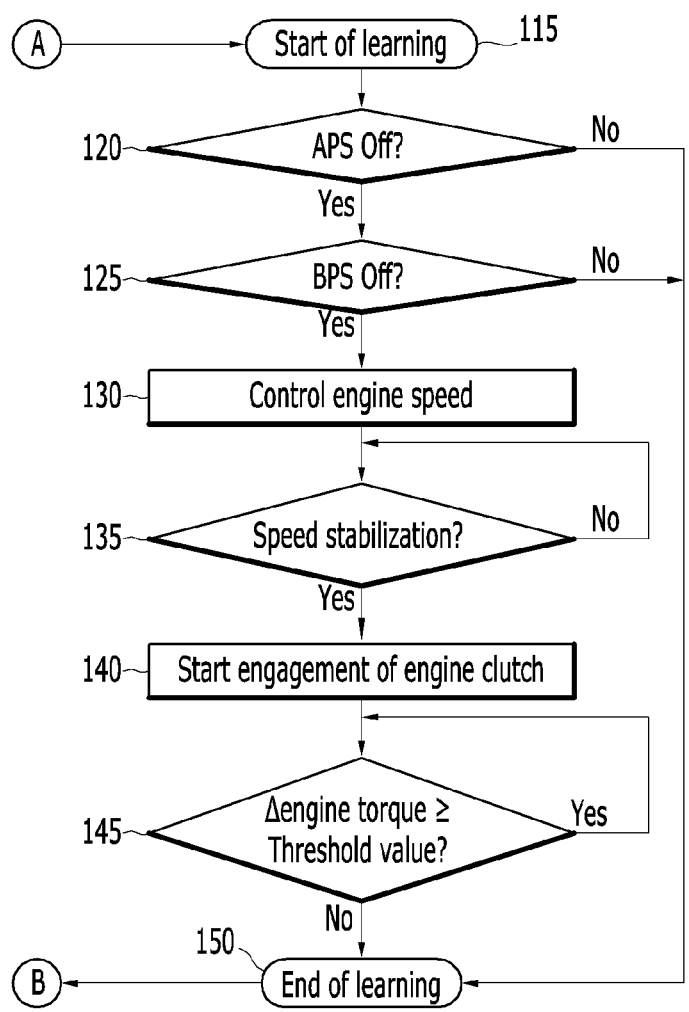
Figure 5:
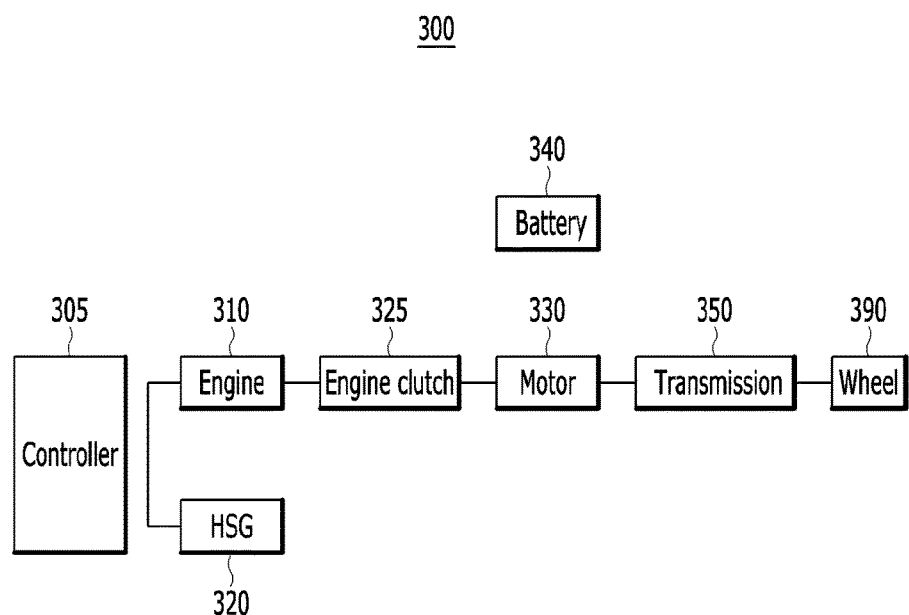
FIG. 5 is a block diagram illustrating the hybrid vehicle to which the method for learning engine clutch kiss point is applied according to an exemplary embodiment of the present invention.

FIG. 2 is a view illustrating a method for learning engine clutch kiss point of a hybrid vehicle according to an exemplary embodiment of the present invention. FIG. 3 is a view illustrating a state of an engine clutch which connects an engine of FIG. 2 with a driving motor of FIG. 2 or disconnects the engine from the driving motor. FIGS. 4A and 4B are a flowchart illustrating the method for learning engine clutch kiss point of the hybrid vehicle according to an exemplary embodiment of the present invention. FIG. 5 is a block diagram illustrating the hybrid vehicle to which the method for learning engine clutch kiss point is applied according to an exemplary embodiment of the present invention.

Referring to FIGS. 2, 3, 4A and 4B, and 5, in a detecting step 100, a controller 305 may be configured to detect whether a deceleration event (or deceleration event information) is generated in front of a hybrid vehicle 300. In other words, using a sensor mounted within the vehicle, the controller 305 may be configured to detect whether a preceding vehicle is decelerating or whether an obstacle is present in front of the traveling vehicle, thus necessitating a deceleration. However, the present invention is not limited to such deceleration events.

The method for learning engine clutch kiss point, which is a process, proceeds to a start step 105 when the deceleration event occurs. For example, the controller 305 may be one or more microprocessors operated by a program or hardware including the microprocessor. The program may include a series of commands for executing the method for learning engine clutch kiss point of the hybrid vehicle according to an exemplary embodiment of the present invention. A navigation device of the hybrid vehicle 300 may use positional information of a global positioning system (GPS), high-precision map information (or precise road map information), or real-time traffic information transmitted from a server disposed extraneous to the vehicle to predict the deceleration event information, and may be configured to provide the predicted deceleration event information to the controller 305. The road map may represent a three-dimensional (3D) map which has high accuracy information on the road and geographical features around the road.

Particularly, the deceleration event information may include front deceleration information (or forward deceleration information) of the vehicle, which requires deceleration of the vehicle, such as toll gate information, interchange (IC) entry/outgoing information, velocity camera information, construction or accident situation information, or safety guidance information. The hybrid vehicle 300 may include the controller 305, the engine 310, a hybrid starter-generator (HSG) 320, the engine clutch 325, the motor (or the driving motor) 330 which may be an electric motor, a battery 340, a transmission 350, and wheels (or driving wheels) 390. The controller 305 may be configured to operate the other components of the vehicle. A device for learning engine clutch kiss point of the hybrid vehicle may include the controller 305 and the engine clutch 325.

The hybrid vehicle 300, which is a hybrid electric vehicle, may use the engine 310 and the motor 330 as power sources, and includes the engine clutch 325 disposed between the engine 310 and the motor 330 to operate the hybrid vehicle 300 in an electric vehicle (EV) mode in which the hybrid vehicle 300 travels by the motor 330 in a state where the engine clutch 325 is opened, and in a hybrid electric vehicle (HEV) mode in which the hybrid vehicle 300 is capable of travelling by both the motor 330 and the engine 310 in a state where the engine clutch 325 is closed.

The hybrid vehicle 300 may include a power train of a transmission mounted electric device (TMED) type in which the motor 330 is connected to the transmission 350. The hybrid vehicle 300 may provide a driving mode, such as the EV mode, which is the electric vehicle mode using power of the motor, and the HEV mode, which uses rotational force of the engine as main power and uses rotational force of the motor as auxiliary power based on whether the engine clutch 325 disposed between the engine 310 and the motor 330 is engaged (or connected). In particular, in the hybrid vehicle 300 including a structure in which the motor 330 may be directly connected to the transmission 350, revolutions per minute (RPM) of the engine may be increased by drive of the HSG 320, power delivery and power cutoff between the engine and the motor may be performed via engagement and release of the clutch 325, a driving force may be transmitted (or transferred) to the wheels 390 through a power transmission system which may include the transmission 350, and torque of the engine may be transmitted to the motor via engagement of the clutch 325 when transmission of the engine torque is requested.

The controller 305 may include a hybrid control unit (HCU), a motor control unit (MCU), an engine control unit (ECU), and a transmission control unit (TCU). The HCU may be configured to start the engine 310 by operating the HSG 320 when the engine stops. The HCU may be the highest controller or an upper controller, and may be configured to operate the other controllers (for example, the MCU) connected to a network such as a controller area network (CAN) which is a vehicle network, and may be configured to execute overall operation of the hybrid vehicle 300.

The MCU may be configured to operate the HSG 320 and the motor 330. Additionally, the MCU may be configured to adjust an output torque of the driving motor 330 via the network based on the control signal output from the HCU, and thus may be configured to operate the motor at maximum efficiency. The MCU may include an inverter configured as a plurality of power switching elements. A power switching element included in the inverter may include an insulated gate bipolar transistor (IGBT), a field effect transistor (FET), a metal oxide semiconductor FET (MOSFET), a transistor, or a relay. The inverter may be configured to convert a direct current (DC) voltage supplied from the battery 340 into a three-phase alternating current (AC) voltage to drive the driving motor 330. The MCU may be disposed between the battery 340 and the motor 330. The ECU may be configured to adjust a torque of the engine 310. Additionally, the ECU may be configured to adjust an operating point (or a driving point) of the engine 310 via the network based on a control signal output from the HCU, and may be configured to operate the engine to output an optimal torque. The TCU may be configured to operate the transmission 350.

The engine 310 may include a diesel engine, a gasoline engine, a liquefied natural gas (LNG) engine, or a liquefied petroleum gas (LPG) engine, and may be configured to output a torque at the operating point based on a control signal output from the ECU. The torque may be combined with driving force of the driving motor 330 in the HEV mode. The engine 310 may be connected to the motor 330 via the engine clutch 325 to generate a power transmitted to the transmission 350.

The HSG 320 may be configured to operate as a motor based on a control signal output from the MCU to start the engine 310, and may be configured to operate as a generator when start of the engine 310 is maintained to provide generated electric power to the battery 340 via the inverter. The HSG 320 may be connected to the engine 310 via a belt. The HSG 320, which is a motor that cranks the engine, may be directly connected to the engine. The engine clutch 325 may be disposed (or mounted) between the engine 310 and the driving motor 330, and may be operated to switch power delivery between the engine 310 and the motor 330. The engine clutch 325 may connect or intercept power between the engine and the motor based on switching of the HEV mode and the EV mode. Operation of the engine clutch 325 may be executed by the controller 305 and the engine clutch 325 may be a dry type engine clutch.

The motor 330 may be operated by a three-phase AC voltage output from the MCU to generate a torque. The motor 330 may be operated as a generator during coasting drive or regenerative braking to supply a voltage (or regenerative energy) to the battery 340. The battery 340 may include a plurality of unit cells. A high voltage for providing a driving voltage (e.g., about 350-450 V DC) to the motor 330 that provides driving power to the wheels 390 or the HSG 320 may be stored in the battery 340. The transmission 350 may include a multiple speed transmission, such as an automatic transmission or a dual clutch transmission (DCT), or a continuously variable transmission (CVT), and may shift to a desired gear using hydraulic pressure based on operation of the TCU to operate engagement elements and disengagement elements. The transmission 350 may be configured to transmit driving force of the engine 310 and/or the motor 330 to the wheels 390, and intercept power delivery between the motor 330 (or the engine 310) and the wheels 390.

According to the start step 105, the controller 305 may be configured to start a deceleration of the driving motor 330. When the deceleration of the driving motor 330 is started, the process proceeds to a determination step 110 and a control step 155. According to the determination step 110, the controller 305 may be configured to determine whether a condition for learning kiss point of the engine clutch is satisfied. The kiss point learning condition is described as follows. A gear shift stage of a transmission 350 may be a drive stage (D stage). In the drive stage, the hybrid vehicle 300 may be configured to perform a coasting drive. A state of charge (SOC) of the battery 340 is within a specific range and a charging limit value and a discharging limit value of the battery may be greater than or equal to a specific value.

According to a start step 115, the controller 305 may be configured to start the kiss point learning of the engine clutch 325 when the kiss point learning condition is satisfied. According to a check step 120, the controller 305 may be configured to detect or check whether an accelerator pedal mounted within the hybrid vehicle 300 is in an off-state (e.g., disengaged or no pressure exerted onto the pedal) when the kiss point learning starts. An on-state or the off-state of the accelerator pedal may be detected by an acceleration pedal position sensor (APS) mounted within the vehicle 300. That is, the sensor may be configured to detect an engagement amount of the pedal or the amount of pressure exerted onto the pedal. According to a check step 125, the controller 305 may be configured to detect or check whether a brake pedal mounted within the hybrid vehicle 300 is in an off-state (e.g., disengaged or no pressure exerted onto the pedal) when the accelerator pedal is in the off-state. An on-state or the off-state of the brake pedal may be detected by a brake pedal position sensor (BPS) of the vehicle 300. That is, the sensor may be configured to detect an engagement amount of the pedal or the amount of pressure exerted onto the pedal.

According to a control step 130, the controller 305 may be configured to adjust a speed of the engine 310 connected to the driving motor 330 using the engine clutch 325 to increase to a speed synchronized with a speed of the driving motor when the accelerator pedal is in the off-state and the brake pedal is in the off-state. In particular, the speed of the engine 310 may be decreased when a driving mode of the hybrid vehicle is switched from the HEV mode to the EV mode, and the speed of the engine may be increased for the kiss point learning of the engine clutch 325. The speed of the driving motor may be reduced as shown in FIGS. 2 and 3 when the driving mode of the hybrid vehicle is switched from the HEV mode to the EV mode. In another exemplary embodiment of the present invention, the controller 305 may use the HSG 320 to adjust the speed of the engine 310 to increase.

According to a stabilization step 135, the controller 305 may be configured to determine whether the speed of the engine 310 is maintained (stabilized) at the speed synchronized with the speed of the driving motor 330. According to a start step 140, the controller 305 may be configured to engage the engine clutch 325 when the speed of the engine is maintained at the speed synchronized with the speed of the driving motor. The controller 305 may be configured to learn a kiss point of the engine clutch 325 by detecting the kiss point generated when the engine clutch is in a slip state.

The kiss point may be a starting point of torque delivery, and may be pressure of a fluid that converts a state of the clutch into the slip state in which the clutch starts friction. The kiss point may indicate an initial hydraulic pressure by which torque is started to be transmitted as two friction members included in the clutch 325 are in contact with each other. The kiss point may be used for control to switch a driving mode of a hybrid vehicle from an electric vehicle (EV) mode to a hybrid electric vehicle (HEV) mode. The slip state of the clutch 325 may be started at the kiss point.

In FIG. 3, the slip state of the clutch 325 may indicate a state in which the clutch starts friction and a speed difference between the both ends of the engine clutch is greater than a predetermined value. The lock-up state of the clutch may indicate a state in which there is no speed difference between the both ends and 100% torque applied to the input of the clutch is transferred to output of the clutch. An open state of the clutch may indicate a state in which the both ends do not interfere with each other and the clutch is physically separated.

According to a comparison step 145, the controller 305 may be configured to determine whether a torque (or a change in torque) of the engine 310 slip-engaged to the engine clutch 325 is equal to or greater than a threshold value. According to a termination step 150, when the torque of the engine 310 is less than the threshold value, the controller 305 may be configured to terminate the kiss point learning of the engine clutch 325. The engine clutch 325 may be released after the learning is completed.

According to the control step 155, the controller 305 may be configured to operate the motor 330 to adjust the speed of the motor to a deceleration target speed of deceleration event position in front of the vehicle. An area indicated by reference numeral 10 of FIG. 2 may indicate a deceleration control region of the driving motor for following the deceleration target speed.

As described above, since the hybrid vehicle is expected to decelerate when the deceleration event information is received at the vehicle while the vehicle is being driven on a real road, the exemplary embodiment of the present invention may have a wide range of the kiss point learning condition and may perform the learning at a wide range of the kiss point of the engine clutch regardless of acceleration and deceleration intention of a driver of the vehicle. The exemplary embodiment of the present invention may perform the kiss point learning of the engine clutch during deceleration of the vehicle using the deceleration event occurrence information.

The components, "~ unit", block, or module which are used in the present exemplary embodiment may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~ part', or the like may be embedded in a computer-readable storage medium, and some part thereof may be dispersedly distributed in a plurality of computers.

As set forth above, exemplary embodiments have been disclosed in the accompanying drawings and the specification. Herein, specific terms have been used, but are just used for the purpose of describing the present invention and are not used for qualifying the meaning or limiting the scope of the present invention, which is disclosed in the appended claims. Therefore, it will be understood by those skilled in the art that various modifications and equivalent exemplary embodiments are possible from the present invention. Accordingly, the actual technical protection scope of the present invention must be determined by the spirit of the appended claims.

DESCRIPTION OF SYMBOLS

305: controller
310: engine
320: HSG
325: engine clutch
330: motor

What is claimed is:

1. A method for learning engine clutch kiss point of a hybrid vehicle, comprising:
   adjusting, by a controller, a speed of a driving motor to be reduced when a deceleration event is generated in front of the hybrid vehicle;
   increasing by the controller, a speed of an engine to be synchronized with the speed of the driving motor using a starter-generator after the speed of the driving motor is adjusted to be reduced;
   engaging, by the controller, an engine clutch that connects the engine with the driving motor or disconnects the engine from the driving motor to start when the speed of the engine is synchronized with the speed of the driving motor; and
   learning, by the controller, a kiss point of the engine clutch by detecting the kiss point generated when the engine clutch is in a slip state.

2. The method of claim 1, further comprising:
   determining, by the controller, whether a torque of the engine slip-engaged to the engine clutch is equal to or greater than a threshold value; and
   terminating, by the controller, the kiss point learning of the engine clutch when the torque of the engine is less than the threshold value.

3. The method of claim 1, further comprising:
   determining, by the controller, whether the speed of the engine is maintained at a speed synchronized with the speed of the driving motor;
   engaging, by the controller, the engine clutch to start when the speed of the engine is maintained at the speed synchronized with the speed of the driving motor.

4. The method of claim 1, further comprising:
   detecting, by the controller, whether an accelerator pedal mounted within the hybrid vehicle is in an off-state;
   detecting, by the controller, whether a brake pedal mounted within the hybrid vehicle is in an off-state;
   adjusting, by the controller, the speed of the engine to increase to a speed synchronized with the speed of the driving motor when the accelerator pedal is in the off-state and the brake pedal is in the off-state.

5. The method of claim 1, further comprising:
   detecting, by the controller, whether information regarding the deceleration event is generated,
   wherein a navigation device of the hybrid vehicle is configured to predict the deceleration event information and provide the predicted deceleration event information to the controller.

6. A device for learning engine clutch kiss point of a hybrid vehicle, the device comprising:
   an engine clutch configured to connect an engine with a driving motor or disconnect the engine from the driving motor; and a controller configured to adjust a speed of the driving motor to be reduced when a deceleration event is generated in front of the hybrid vehicle,
wherein the controller is configured to increase a speed of an engine to be synchronized with the speed of the driving motor using a starter-generator after the speed of the driving motor is adjusted to be reduced, engage the engine clutch to start when the speed of the engine is synchronized with the speed of the driving motor, and learn a kiss point of the engine clutch by detecting the kiss point generated when the engine clutch is in a slip state.

7. The device of claim 6, wherein the controller is further configured to:
determine whether a torque of the engine slip-engaged to the engine clutch is equal to or greater than a threshold value; and
terminate the kiss point learning of the engine clutch when the torque of the engine is less than the threshold value.

8. The device of claim 6, wherein the controller is further configured to:
determine whether the speed of the engine is maintained at a speed synchronized with the speed of the driving motor;
engage the engine clutch to start when the speed of the engine is maintained at the speed synchronized with the speed of the driving motor.

9. The device of claim 6, wherein the controller is further configured to:
detect whether an accelerator pedal mounted within the hybrid vehicle is in an off-state; detect whether a brake pedal mounted within the hybrid vehicle is in an off-state;
adjust the speed of the engine to increase to a speed synchronized with the speed of the driving motor when the accelerator pedal is in the off-state and the brake pedal is in the off-state.

10. The device of claim 6, wherein the controller is further configured to:
determine whether information regarding the deceleration event is generated.

11. The device of claim 10, further comprising:
a navigation device of the hybrid vehicle configured to predict the deceleration event information and provide the predicted deceleration event information to the controller.

* * * * *